(12) United States Patent
Schlichenmaier et al.

(10) Patent No.: US 12,282,090 B2
(45) Date of Patent: Apr. 22, 2025

(54) COHERENT, MULTI-STATIC RADAR SYSTEM, IN PARTICULAR FOR USE IN A VEHICLE

(71) Applicant: Robert Bosch GmbH, Stuttgart-Feuerbach (DE)

(72) Inventors: Johannes Schlichenmaier, Ulm (DE); Benedikt Meinecke, Ulm (DE); Christian Waldschmidt, Ulm (DE); Jürgen Hasch, Stuttgart (DE)

(73) Assignee: Robert Bosch GmbH

( * ) Notice: Subject to any disclaimer, the term of this patent is extended or adjusted under 35 U.S.C. 154(b) by 440 days.

(21) Appl. No.: 17/609,634

(22) PCT Filed: May 6, 2020

(86) PCT No.: PCT/EP2020/062601
§ 371 (c)(1),
(2) Date: Nov. 8, 2021

(87) PCT Pub. No.: WO2020/225314
PCT Pub. Date: Nov. 12, 2020

(65) Prior Publication Data
US 2022/0229175 A1 Jul. 21, 2022

(30) Foreign Application Priority Data
May 9, 2019 (DE) ..................... 10 2019 112 078.0

(51) Int. Cl.
*G01S 13/931* (2020.01)
*G01S 13/74* (2006.01)
(52) U.S. Cl.
CPC ............ *G01S 13/931* (2013.01); *G01S 13/74* (2013.01)

(58) Field of Classification Search
CPC ................................ G01S 13/931; G01S 13/74
See application file for complete search history.

(56) References Cited

U.S. PATENT DOCUMENTS

| 5,826,819 A | 10/1998 | Oxford |
| 6,363,619 B1 | 4/2002 | Schirmer et al. |
| (Continued) | | |

FOREIGN PATENT DOCUMENTS

| BR | 102015012962 A2 * | 1/2016 | ............ G01S 13/02 |
| CN | 101086768 A | 12/2007 | |
| (Continued) | | | |

OTHER PUBLICATIONS

Dadash, M. Sadegh, et al, "Design of Low-Power Active Tags for Operation with 77-81 GhHz FMCW Radar", published In IEEE Transactions on Microwave Theory and Techniques, vol. 65, Issue: 12, Dec. 2017 (DOI: 10.1109/TMTT.2017.2769079).
(Continued)

*Primary Examiner* — Vladimir Magloire
*Assistant Examiner* — Maxine McKenzie Phillips
(74) *Attorney, Agent, or Firm* — Arnall Golden Gregory LLP

(57) ABSTRACT

A radar system which can be used in a vehicle is presented. The radar system has a radar sensor for transmitting and receiving first radar signals and an evaluation device for processing radar signals received by the radar sensor. The radar system also has at least one active radar tag which is configured to retransmit received radar signals, amplified and modulated, as second radar signals, and the evaluation device is configured to determine information about an object both on the basis of components, received by the radar sensor, of the first radar signals reflected at the object and on the basis of components, received by the radar sensor, of the second radar signals reflected at the object.

11 Claims, 3 Drawing Sheets

(56) References Cited

U.S. PATENT DOCUMENTS

| | | | |
|---|---|---|---|
| 9,369,160 B2 * | 6/2016 | Barott | H04B 1/1027 |
| 11,867,830 B2 * | 1/2024 | Shahvirdi Dizaj Yekan | G01S 13/931 |
| 2018/0246200 A1 | 8/2018 | Goossen et al. | |

FOREIGN PATENT DOCUMENTS

| | | | | |
|---|---|---|---|---|
| CN | 103105606 A | | 5/2013 | |
| CN | 107883898 A | * | 4/2018 | |
| DE | 19707590 | | 9/1998 | |
| DE | 10349919 A1 | * | 5/2005 | G01S 13/34 |
| DE | 102011075767 A1 | | 11/2012 | |
| DE | 102013008953 | | 11/2014 | |
| DE | 102017207783 B3 | * | 6/2018 | G01F 23/284 |
| EP | 2463683 A1 | * | 6/2012 | G01S 13/34 |
| JP | 2000-019246 | | 1/2000 | |
| JP | 2005031810 A | * | 2/2005 | |
| JP | 4667689 B2 | * | 4/2011 | G06K 19/067 |
| WO | WO-0046771 A1 | * | 8/2000 | G06K 7/0008 |
| WO | WO-2010143909 A2 | * | 12/2010 | G01S 13/84 |
| WO | WO2018069760 | | 4/2018 | |

OTHER PUBLICATIONS

Meinecke, B, et al, "Coherent Multistatic MIMO Radar Networks Based on Repeater-Tags", published in: IEEE Transactions on Microwave Theory and Techniques ( vol. 67, Issue: 9, Sep. 2019).

Sarkas, I., at al, "W-band 65-nm CMOS and SiGe BiCMOS Transmitter and Receiver with Lumped I-Q Phase Shifters", published in 2009 IEEE Radio Frequency Integrated Circuits Symposium (DOI: 10.1109/RFIC.2009.5135576).

International Preliminary Report on Patentability issued in PCT/EP2020/062601, mailed Nov. 18, 2021.

Japanese Office Action issued in related JP Application No. 2021-566354, dated Oct. 3, 2023, with English translation.

Chinese Notice of First Examination Opinion issued in related CN Application No. 202080036412.4, mailed Oct. 18, 2024 with English translation of Search Report.

* cited by examiner

COHERENT, MULTI-STATIC RADAR SYSTEM, IN PARTICULAR FOR USE IN A VEHICLE

FIELD OF THE INVENTION

The invention relates to a radar system which can be used in particular in a vehicle.

STATE OF THE ART

A radar system is used to detect distant objects. The aim is to be able to determine at least a position of an object with the aid of the radar system, but possibly also information about its speed of movement and/or direction of movement. For this purpose, the radar system uses a radar sensor to transmit radar signals in the form of electromagnetic waves and detects echoes of these radar signals, i.e. components of the radar signals that are reflected back from the object.

In particular, radar systems are used in modern vehicles to automatically detect objects such as other vehicles or obstacles, for example in order to provide support to a driver of the vehicle via assistance systems or even to control the vehicle autonomously, based on information obtained in this way.

DISCLOSURE OF THE INVENTION

Against this background, the approach presented here introduces a radar system and a vehicle equipped with such a radar system according to the independent claims. Advantageous further developments and improvements of the approach presented here result from the description and are described in the dependent claims.

Advantages of the Invention

Embodiments of the present invention may advantageously make it possible to increase the accuracy with which the position, speed and/or direction of movement of an object can be measured, using a radar system of relatively simple design. Such a more precise radar system can be used advantageously in a vehicle.

According to a first aspect of the invention, a radar system is described which can be used in particular in a vehicle. The radar system has a radar sensor for transmitting and receiving first radar signals and an evaluation device for processing radar signals received by the radar sensor. The radar system is characterized in that it has a so-called active radar tag, which is configured to retransmit received radar signals, amplified and modulated, as second radar signals. The radar system is further characterized in that the evaluation device is configured to determine information about an object both on the basis of components, received by the radar sensor, of the first radar signals reflected at the object and on the basis of components, received by the radar sensor, of the second radar signals reflected at the object.

A second aspect of the invention relates to a vehicle with a radar system according to an embodiment of the first aspect of the invention.

Ideas relating to embodiments of the present invention may be considered to be based, inter alia, on the conceptions and findings described below.

In order to determine the position and movement of an object more accurately, i.e. to increase the angular resolution of a radar system, it has been proposed that a network of spatially distributed radar sensors be set up. Each of the radar sensors used in this network should have a fully-fledged radar sensor comprising a signal generation unit, a transmitter and a receiver. Each of the radar sensors is controlled by an RF analogue signal that is shared between the participating radar sensors via a physical connection.

However, interconnecting spatially separated radar sensors to improve angular resolution is currently only done in the field of radio astronomy.

Interferometry methods are used for this purpose. Coherent evaluation of spatially separated radar signals only takes place using highly specific technology, for the most part under laboratory conditions.

Other approaches exist for cooperatively evaluating a plurality of spatially separated radar sensors. However, they do not produce any coherence.

For coherent evaluation of a plurality of radar signals, it is normally necessary to distribute a high-frequency transmission signal, for example via rigid hollow conductors, to a plurality of separately placed radar sensors. Alternatively, a common low-frequency reference signal can be provided to the radar sensors, which can be used to generate coherent transmission signals. Both approaches require highly specialized radar hardware and an extremely large amount of mechanical effort. Therefore, these methods have not yet been used outside of idealized laboratory set-ups.

During cooperative evaluation of signals from a plurality of radar sensors without coherence, the signal-to-noise ratio (SN ratio) generally deteriorates considerably, so that operation beyond a few meters is hardly possible. The lack of signal coherence also generally makes phase evaluation, as required for angle and velocity estimation, for example, impossible.

The approach presented here proposes a radar system in which a network of spatially distributed radar sensors is constructed virtually, with the proposed network maintaining signal and noise coherence. This makes it possible to measure not only the distance of an object based on the phase information that is still present, but also the speed and angle of movement of the target, i.e. of an object or of partial areas of an extended object. The spatial distribution of the radar sensors can lead to a greater angular resolution. This allows direct estimation of movement parameters, particularly of extended objects such as vehicles, based on different viewing angles of the objects resulting from the spatial separation of the virtual sensor positions.

Broadly summarized, with embodiments of the radar system presented here, a network is set up which, in addition to at least one radar sensor, has at least one so-called active radar tag. The radar tag is sometimes also referred to as the active tag or repeater tag. The radar tag is a system that can receive radar signals, amplify them and then retransmit them in a modulated form. In particular, a radar tag can receive, amplify and modulate HF radar signals which have been reflected from the object being observed and then retransmit them without destroying the noise coherence, in particular the phase noise coherence. Consequently, the signal and noise coherence is preserved so that the phase information of the observed object can also be evaluated and thus remains available for angle and velocity estimation, for example.

The radar tag of the proposed radar system is therefore unable to generate radar signals independently. It can however receive, modulate, actively amplify and then retransmit incident radar signals.

The radar sensor of the radar system is able to receive radar signals across a relatively wide frequency spectrum, so that not only the first radar signals generated and transmitted by the radar sensor itself, but also the second radar signals modulated and returned by the radar tag can be received by the radar sensor.

The evaluation device of the radar system proposed here is able to determine information about an object being observed based on components of the first radar signals reflected by the object and received by the radar sensor. In addition, the evaluation device is also able to determine information about the object on the basis of components of the second radar signals reflected by the object and also received by the radar sensor. Since the second radar signals represent a modulated image of the first radar signals, on the one hand the phase information contained in the first radar signals is largely coherently contained within them. On the other hand, due to the realized modulation, the second radar signals differ from the first radar signals slightly but sufficiently for the two radar signals to be distinguished by the radar sensor or the evaluation device, respectively.

Use of the radar tag makes it realistically possible to construct a distributed radar sensor network as it were virtually, since there is no need to establish a physical connection between the radar sensors. The radar tag receives the first radar signal emitted by the radar sensor and reflected by an object towards the radar tag, amplifies and modulates it, then retransmits it towards the radar sensor acting as a transmission sensor node. This provides additional phase information of the observed object depending on the position of the radar tag, which can be used, for example, for angle and velocity estimation.

By using one or more radar tags together with at least one radar sensor, additional, virtual sensor positions can thus be generated. The radar tag can therefore be regarded as an additional sensor whose received second radar signals can be coherently evaluated at the physical radar sensor or by the evaluation device connected to the radar sensor. A very large aperture of virtual sensor positions can be created through phase coherence. This allows a very high angular resolution to be achieved. The phase coherence obtained can also allow evaluation of the speed information of the observed object. The signal-to-noise ratio of the targets also remains largely unaffected by the preserved noise coherence.

Embodiments of the radar system described here do not generally require specially developed radar hardware. By adding one or more active radar tags and adapting the information gathering in the evaluation device, common radar systems can be enabled to determine position and movement information about an observed object with high precision.

The radar tag itself can be of relatively simple design, consisting of only a few components. In particular, the radar tag does not necessarily require digital circuitry. The radar tag requires only a power supply and a suitable modulation signal, which places only minor requirements on the mechanical or electrical design of the network generated with the radar system described here.

Several different active radar tags have previously been described that can be used in the radar system presented here. A possible active radar tag is described in Sarkas et al: "W-band 65-nm CMOS and SiGe BiCMOS transmitter and receiver with lumped I-Q phase shifters", published in 2009 IEEE Radio Frequency Integrated Circuits Symposium (DOI: 10.1109/RFIC.2009.5135576). Another possible active radar tag is described in Dadash et al.: "Design of Low-Power Active Tags for Operation With 77-81-GHz FMCW Radar", published in IEEE Transactions on Microwave Theory and Techniques, Volume: 65, Issue: 12, December 2017 (DOI: 10.1109/TMTT.2017.2769079).

According to one embodiment, the active radar tag is configured to retransmit received radar signals, amplified and shifted in frequency by a frequency change, as second radar signals.

In other words, the active radar tag can model received radar signals by changing a frequency of the received radar signal by a small amount, i.e. making a small frequency shift, before retransmitting the modulated radar signal as a second radar signal. On the one hand, such frequency modulation is technically easy to implement in the radar tag. On the other hand, the second radar signal, shifted in frequency by the frequency change, can easily be received by the radar sensor and distinguished from the first radar signal or echoes of the first radar signal due to the frequency difference.

In particular, the frequency change can be between 0.5 kHz and 2 MHz, preferably between 2 kHz and 500 kHz, and more preferably between 10 kHz and 100 kHz. On the one hand, such frequency changes have only a minor influence on phase information in the radar signal, which is typically transmitted at a frequency in the range of many gigahertz. On the other hand, the second radar signal with such a frequency change can be distinguished from the unchanged first radar signal by technically simple means.

According to one embodiment, the active radar tag is configured to retransmit received radar signals amplified by up to at least 10 dB, preferably by up to at least 20 dB, as second radar signals.

In other words, the radar tag should be able to amplify radar signals that reach an object as first radar signals from the radar sensor and then continue as echoes to the radar tag, thereby losing considerable signal strength, by up to at least 10 dB or more, in order to then retransmit them amplified as second radar signals. The ability to retransmit the second radar signals with sufficient amplification ensures that the second radar signals, which in turn lose signal intensity on their way back to the radar sensor, ultimately still arrive at the radar sensor with sufficient signal intensity to be reliably detected there. Typically, the radar tag will not allow gains greater than 40 dB.

"By up to at least 10 dB" can be understood to mean that the radar tag is generally able to amplify received signals by at least 10 dB, but, depending on the specific situation and signal strength of a received signal, this amplification potential does not need to be fully utilized in all cases; rather, lower amplification can also be implemented where relatively strong signals are received.

According to one embodiment, the radar sensor is a MIMO radar sensor with a plurality of transmission antennas and a plurality of receiving antennas.

In a MIMO (multiple-input, multiple-output) radar sensor, each transmitting antenna is able to emit any transmission signal independently of the other transmitting antennas, which signal can be received by each receiving antenna, digitized and then subjected to common radar signal processing.

From an array of N transmitting antennas and an array of K receiving antennas, a virtual array of K·N elements with a greatly enlarged virtual aperture is computed.

MIMO radar systems can be used to improve spatial resolution and achieve significantly improved immunity to interference. By improving the signal-to-noise ratio, the probability of detection of targets is also increased.

The radar sensor of the radar system described here may preferably be a mono-static MIMO radar sensor in which the antennas are all concentrated in a very small space, similar to a point target as in traditional radar systems. In contrast, with a bi-static or "distributed" MIMO radar sensor, the antennas are widely distributed in space so that a target is viewed from a different aspect angle by each of the antennas. A mono-static MIMO radar system is similar in design to a thinned array of a phased array antenna, in which each radiator has its own transceiver module and its own A/D converter. However, in a phased array antenna, each radiator only transmits (possibly time-shifted) a copy of a transmission signal, which has been generated in a central waveform generator. In a MIMO radar system, each radiator has its own waveform generator and, subsequently, each radiator uses an individual waveform. This individual waveform is also the basis for an assignment of the echo signals to their source. For more effective radar signal processing, each individual transmission signal can then be specifically modified ("adaptive waveform") with the aim of improving the signal-to-noise ratio (SNR) and the signal-to-interference-plus-noise ratio (SINR) for each individual target in the subsequent scan. If the respective waveforms are generated in the transmitters synchronously with one another, i.e. based on a synchronizing clock from a common "mother generator", this is referred to as a coherent MIMO system.

According to a more specific embodiment, the MIMO radar sensor may have fewer than four transmission antennas and fewer than five receiving antennas.

Traditionally, attempts have been made to increase a radar system's resolution by including more than the conventional three transmission antennas and four receiving antennas in its MIMO radar sensor. For example, MIMO radar sensors with six transmission antennas and eight receiving antennas have been proposed to improve resolution. However, this brings increased complexity and thus a greater manufacturing effort and higher costs.

With the radar system proposed here, an improved resolution can be achieved without having to increase the complexity of the radar sensors employed. In particular, simply designed, low-cost MIMO radar sensors with a maximum of three transmission antennas and a maximum of four receiving antennas can be used.

According to one embodiment, both the first radar signal and the second radar signal can be in a frequency range of between 40 GHz and 120 GHz, preferably in a frequency range of between 60 GHz and 100 GHz and more preferably in a frequency range of between 70 GHZ and 90 GHz.

In other words, the radar sensor may be configured to transmit and receive radar signals in the said frequency range. Furthermore, the active radar tag may be configured to receive, amplify, modulate and retransmit radar signals in the said frequency range. For example, radar tags designed to operate in a frequency range of 77 to 81 GHz have been proposed.

In particular, the radar signals used in the radar system can be frequency-modulated continuous-wave (FMCW) radar signals.

According to one embodiment, the radar sensor and the active radar tag may be laterally spaced from each other at a distance of between 1 cm and 10 m, preferably between 10 cm and 2 m, more preferably between 20 cm and 2 m.

In other words, the radar sensor and one or more active radar tags may be disposed relative to one another in such a way that they are spaced significantly, for example ten times to a thousand times, further apart than a spacing between multiple antennas within the radar sensor itself. The distance between the radar sensor and the active radar tag can be, for example, ten to a thousand times the wavelength of the radar signals used. On the one hand, such a lateral distance makes it possible to achieve a high spatial resolution with the proposed radar system. On the other hand, ambiguities in the interpretation of received radar signals can still be analyzed largely without difficulty.

The radar sensor and the radar tag(s) can be disposed on a common surface, for example on a vehicle body, e.g. in a bumper or a front apron. However, they can also be disposed on different surfaces and/or at different heights. For example, a radar tag may be attached to the side of a vehicle body and the radar sensor may be attached to the front of the vehicle body, or vice versa.

According to one embodiment, the active radar tag may be configured to transmit the second radar signals in a direction opposite to the received radar signals.

In other words, the active radar tag can be configured in such a way that a receiving antenna can receive first radar signals coming from a certain angular range and a transmitting antenna can transmit back the modulated and amplified second radar signals substantially in the direction from which the first radar signals were received. This means that the second radar signals are to a large extent transmitted to the object from which the first radar signals were reflected in the form of echoes to the active radar tag.

With such an embodiment, the first radar signals can be emitted from the radar sensor towards an object with one part of these first radar signals being reflected directly back to the radar sensor and another part of the first radar signals being reflected towards the active radar tag. From the active radar tag, the second radar signals can then be sent back to the object and reflected by it as echoes to the radar sensor. The radar sensor can distinguish between echoes of the first radar signals and echoes of the second radar signals based on the modulation performed at the active radar tag.

All in all, the radar system is thus able to act as a virtually arrayed network in which the object is irradiated with radar signals from different angles, so that echoes from different angles can be received by the radar sensor. The object can thus not only be detected along a mono-static path, but along a bi-static path or, where a plurality of active radar tags are used, along a multi-static path. An increased resolution can thus be achieved due to the different angle-dependent radar signature of the object.

According to an alternative embodiment, the active radar tag may be configured to transmit the second radar signals in a direction towards the radar sensor.

In other words, the active radar tag can transmit the second radar signals not predominantly towards the object from which echoes of the first radar signals were received, but directly towards the radar sensor. This can shorten the path that the second radar signals must travel before reaching the radar sensor and thus reduce attenuation losses in the radar signals.

Embodiments of the radar system described here may be used, in particular, in a vehicle according to an embodiment of the second aspect of the invention. On the one hand, advantageous use can be made of the fact that the proposed radar system enables an increased resolution and can thus improve the probability of detection of distant objects such as other vehicles or obstacles. On the other hand, advantageous use can be made of the fact that the proposed radar system requires relatively few, simple and inexpensive components.

It should be noted that some of the possible features and advantages of the invention are described here with reference to various embodiments. A person skilled in the art will recognize that the features may be suitably combined, adapted or interchanged to arrive at further embodiments of the invention.

BRIEF DESCRIPTION OF DRAWINGS

Embodiments of the invention are described below with reference to the accompanying drawings, in which neither the drawings nor the description are to be construed as limiting the invention.

The figures are only schematic and not to scale. Identical reference signs in the figures denote identical or identically acting features.

EMBODIMENTS OF THE INVENTION

Figure 1:
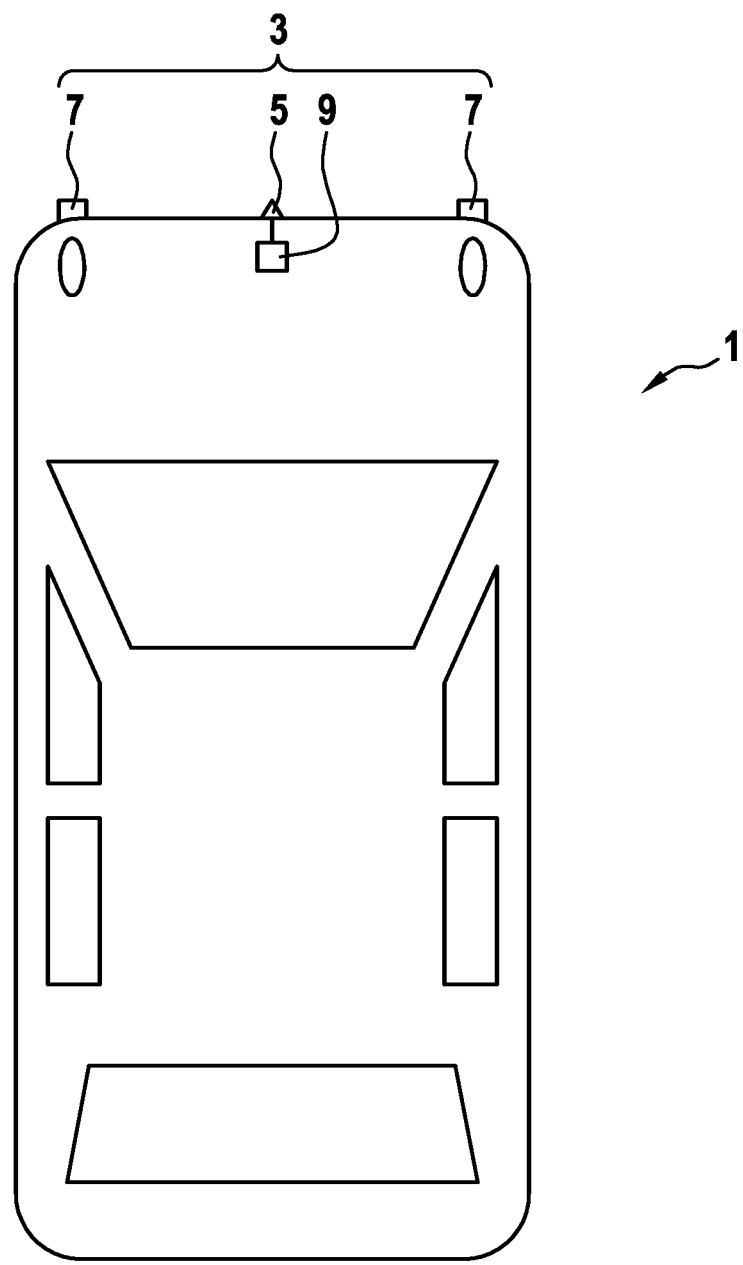
FIG. 1 shows a vehicle viewed from above with a radar system according to an embodiment of the invention.

FIG. 1 shows a vehicle 1 in the form of a car with a radar system 3 according to an embodiment of the invention. The radar system 3 comprises a radar sensor 5, two active radar tags 7 and an evaluation device 9.

In the example shown, the radar sensor 5 is disposed centrally on the front of the vehicle 1, for example in the area of a bumper or an apron on the body of the vehicle 1. The two active radar tags 7 are each located on opposite sides on the same front of the vehicle 1. However, such an arrangement is merely exemplary. In principle, both the radar sensor 5 and the active radar tags 7 can be disposed at different points on the body of the vehicle 1.

The radar sensor 5 is connected to a power supply (not shown) and is designed to transmit and receive first radar signals. For this purpose, the radar sensor 5 has a signal generator, at least one transmitting antenna and at least one receiving antenna. Preferably, the radar sensor 5 is equipped as a MIMO radar sensor with multiple transmitting antennas and multiple receiving antennas.

In the example shown, the evaluation device 9 is provided externally to the radar sensor 5 and is connected to it for the exchange of signals. Alternatively, the evaluation device 9 can also be integrated into the radar sensor 5.

The active radar tags 7 are configured to receive, amplify, modulate and then retransmit incoming radar signals as second radar signals. For this purpose, each active radar tag 7 has at least one receiving antenna, one amplifier, one modulator and one transmitting antenna.

Figure 3:
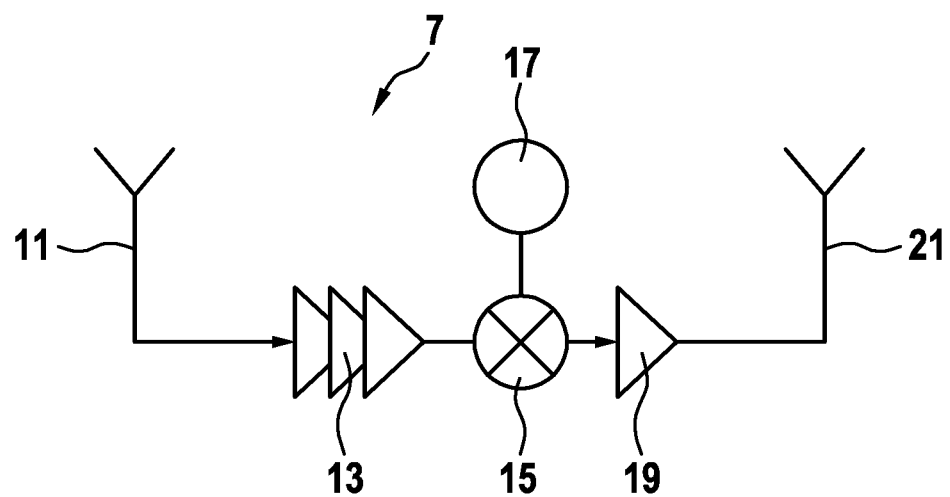
FIG. 3 shows an example of an active radar tag for a radar system according to an embodiment of the invention.

FIG. 3 shows an exemplary embodiment of an active radar tag 7. The radar tag 7 has a receiving antenna 11, a three-stage low-noise amplifier (LNA) 13, a mixer 15, an external local oscillator 17, a variable-gain amplifier (VGA) 19 and a transmitting antenna 21.

The active radar tag 7 is capable of both amplifying and slightly shifting the frequency of FMCW radar signals in a frequency band, for example, in the vicinity of 77 GHz.

Figure 2:
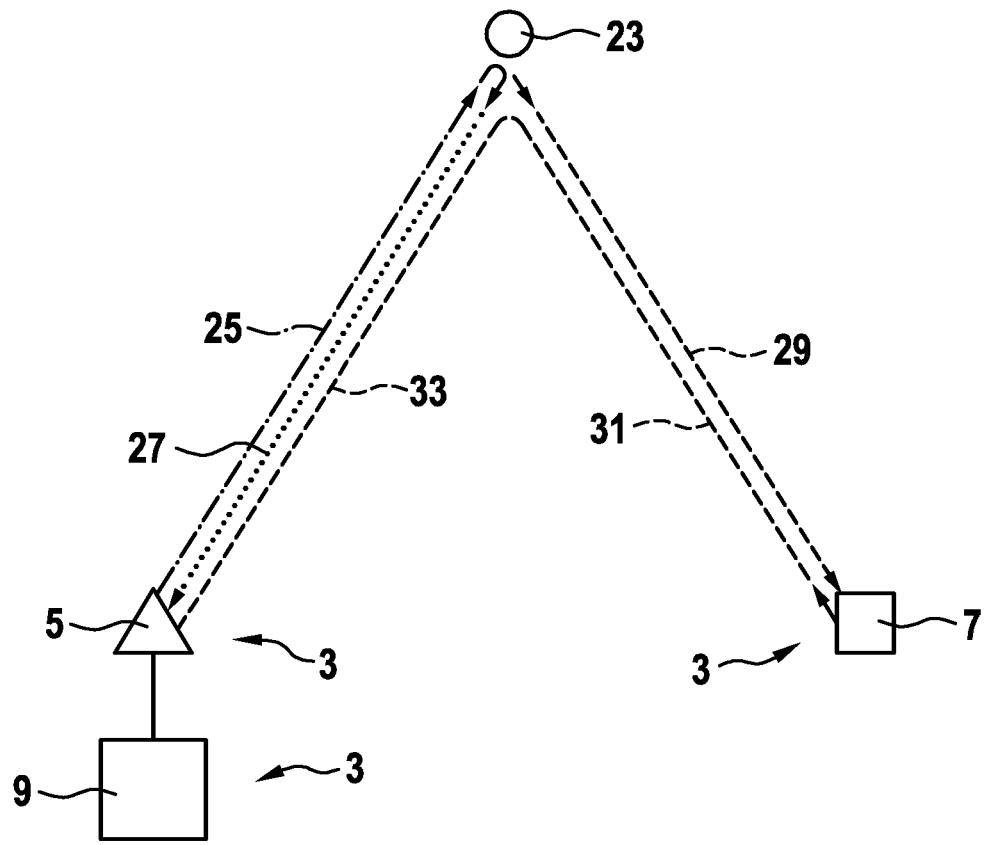
FIG. 2 illustrates signal paths of a bi-static path in a radar system according to an embodiment of the invention.

FIG. 2 illustrates signal paths of radar signals which are transmitted and received by the radar system 3.

The radar sensor 5 transmits a first radar signal 25 in a direction towards an object 23. The first radar signal 25 is shown as a dot and dash line. At the object 23, a part of this first radar signal 25 is reflected directly back to the radar sensor 5 and can be received there as an echo 27 of the first radar signal 25. The echo 27 of the first radar signal 25 is shown as a dotted line. Another part 29 of the first radar signal 25 is reflected towards the active radar tag 7. This part 29 of the first radar signal 25 is received, amplified and modulated by the active radar tag 7 before being transmitted back towards the object 23 as a second radar signal 31. This second radar signal 31 is in turn reflected by the object 23 and can then be received as an echo 33 by the radar sensor 5.

The evaluation device 9 can then gather information about the object 23 based both on the echoes 27 corresponding to components of the first radar signals 25 reflected from the object 23 and on the echoes 33 corresponding to components of the second radar signals 31 reflected from the object 23.

In the example shown, for the sake of simplicity, the radar system 3 comprises only a single active radar tag 7, so that a bi-static path is formed by the first and second radar signals 25, 31 and their echoes 27, 29, 33. However, the radar system 3 may also comprise a plurality of active radar tags 7, resulting in a multi-static path.

Figure 4:
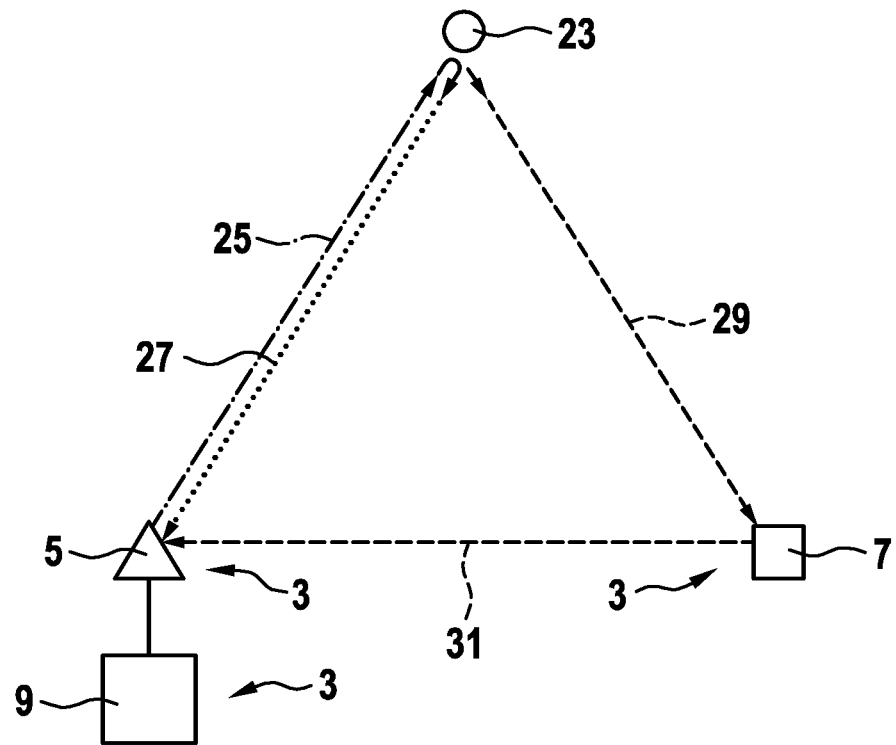
FIG. 4 illustrates signal paths of a bi-static path in a radar system according to an alternative embodiment of the invention.
Figure 5:
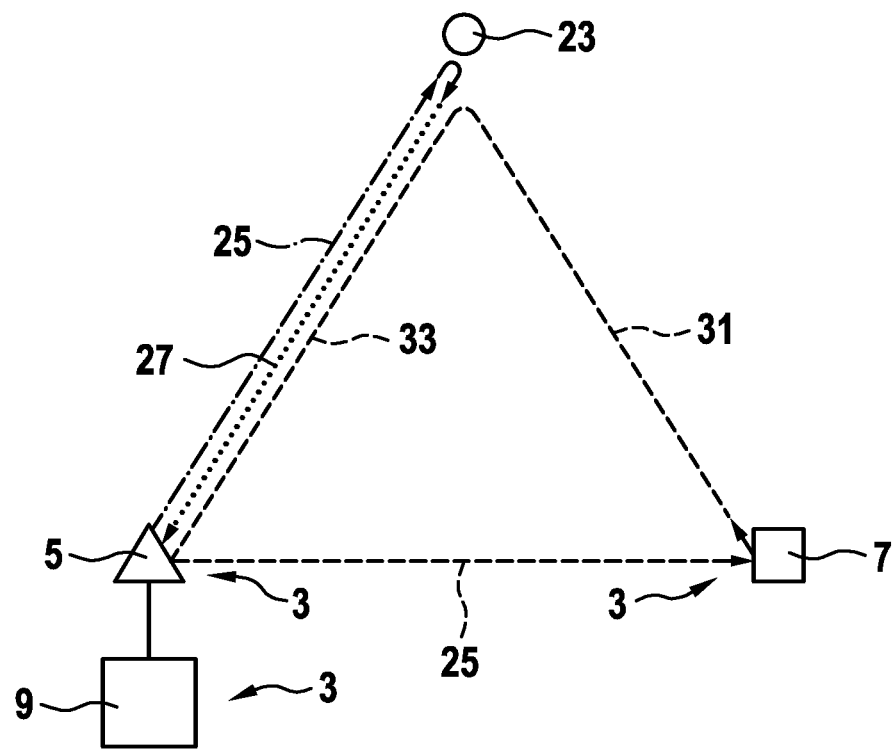
FIG. 5 illustrates signal paths of a bi-static path in a radar system according to another alternative embodiment of the invention.

FIGS. 4 and 5 illustrate signal paths of radar signals which are transmitted and received back in alternatively configured radar systems 3.

In these cases too, the radar sensor 5 transmits a first radar signal 25 in a direction towards an object 23, and at the object 23 a part of this first radar signal 25 is reflected directly back to the radar sensor 5 and can be received there as an echo 27 of the first radar signal 25. In the embodiment illustrated in FIG. 4, another part 29 of the first radar signal 25 is reflected towards the active radar tag 7. This part 29 of the first radar signal 25 is received, amplified and modulated by the active radar tag 7. It is then transmitted as a second radar signal 31 directly towards the radar sensor 5 and received by it. Alternatively, in the embodiment illustrated in FIG. 5, part of the first radar signal 25 is transmitted directly towards the radar tag 7, amplified and modulated there and then transmitted as a second radar signal 31 towards the object 23, from where echoes 33 are transmitted to and received by the radar sensor 5. These embodiments also result in bi-static paths, which can be significantly shorter than in the embodiment of FIG. 2.

It should be noted that inventors of the present invention intend to publish further details of possible embodiments of the radar system described here, including details of the active radar tags that can be used therein, as well as details of possible signal generation and signal evaluation in the radar system, in a scientific article entitled "Coherent Multistatic MIMO Radar Networks based on Repeater Tags". The article is expected to be published in IEEE Transactions of Microwave Theories and Techniques.

Finally, it should be noted that terms such as "having", "comprising", etc. do not exclude other elements or steps, and terms such as "one" or "a" do not exclude a plurality. Reference signs in the claims are not to be considered as limitations.

The invention claimed is:

1. A radar system, in particular for use in a vehicle, the radar system comprising:
   a radar sensor for transmitting and receiving first radar signals;
   an evaluation device for processing radar signals received by the radar sensor after a reflection at an object that is separate from the radar system;
   characterized in that
   the radar system also has at least one active radar tag which is configured to retransmit received radar signals, amplified and modulated, as second radar signals, wherein the active radar tag is configured to retransmit received radar signals, amplified and shifted in frequency by a frequency change, as the second radar signals, wherein the radar sensor and the active radar tag are laterally spaced from each other at a distance of between 1 cm and 10 m and the evaluation device is configured to determine information about the object both on the basis of components, received by the radar sensor, of the first radar signals and on the basis of components, received by the radar sensor, of the second radar signals.

2. The radar system according to claim 1 wherein the active radar tag is configured to retransmit received radar signals, amplified and frequency modulated, as second radar signals.

3. The radar system according to claim 1, wherein the frequency change is between 0.5 kHz and 2 MHz.

4. The radar system according to claim 1, wherein the active radar tag is configured to retransmit received radar signals amplified by at least 10 dB as second radar signals.

5. The radar system according to claim 1, wherein the radar sensor is a MIMO radar sensor with a plurality of transmitting antennas and a plurality of receiving antennas.

6. The radar system according to claim 5, wherein the MIMO radar sensor has fewer than four transmitting antennas and fewer than five receiving antennas.

7. The radar system according to claim 1, wherein both the first radar signal and the second radar signal are in a frequency range of between 40 GHz and 120 GHz.

8. The radar system according to claim 1, wherein the active radar tag is configured to transmit the second radar signals in a direction opposite to the received radar signals.

9. The radar system according to claim 1, wherein the active radar tag is configured to transmit the second radar signals in a direction towards the radar sensor.

10. A vehicle with the radar system according to claim 1.

11. The radar system according to claim 1, wherein the distance is between 10 cm and 2 m.

* * * * *